United States Patent
Swartzlander et al.

(10) Patent No.: US 8,224,958 B2
(45) Date of Patent: *Jul. 17, 2012

(54) AUTO-CREATION OF STORAGE RESOURCE MANAGEMENT PATHS

(75) Inventors: Benjamin B. Swartzlander, San Jose, CA (US); Senthilkumkar Ponnappan, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/029,973

(22) Filed: Feb. 17, 2011

(65) Prior Publication Data

US 2011/0145403 A1 Jun. 16, 2011

Related U.S. Application Data

(63) Continuation of application No. 11/341,467, filed on Jan. 27, 2006, now Pat. No. 7,912,942.

(51) Int. Cl.
*G06F 15/173* (2006.01)

(52) U.S. Cl. ........................................ 709/224; 370/254

(58) Field of Classification Search .................. 709/224; 370/254

See application file for complete search history.

(56) References Cited

U.S. PATENT DOCUMENTS

| | | | |
|---|---|---|---|
| 6,098,067 A | 8/2000 | Erickson | |
| 6,430,611 B1 | 8/2002 | Kita et al. | |
| 6,834,299 B1 | 12/2004 | Hamilton, II et al. | |
| 6,968,345 B1 | 11/2005 | Muhlestein | |
| 7,222,168 B2 | 5/2007 | Kitamura et al. | |
| 7,293,039 B1 * | 11/2007 | Deshmukh et al. | 707/805 |
| 7,519,624 B2 * | 4/2009 | Korupolu et al. | 707/200 |
| 7,523,187 B1 | 4/2009 | Lavallee et al. | |
| 7,656,823 B1 * | 2/2010 | Monga et al. | 370/255 |
| 7,912,942 B1 | 3/2011 | Swartzlander et al. | |
| 2002/0129216 A1 | 9/2002 | Collins | |
| 2002/0143932 A1 | 10/2002 | Quintero et al. | |
| 2003/0037106 A1 | 2/2003 | Yoshioka | |
| 2003/0163548 A1 | 8/2003 | Stickler | |
| 2003/0191911 A1 | 10/2003 | Kleinschnitz et al. | |
| 2004/0064827 A1 * | 4/2004 | Cox | 719/321 |
| 2005/0004978 A1 | 1/2005 | Reed et al. | |
| 2005/0071482 A1 * | 3/2005 | Gopisetty et al. | 709/229 |

(Continued)

FOREIGN PATENT DOCUMENTS

JP 2005018159 1/2005

OTHER PUBLICATIONS

Otoo, et al. Disk Cache Replacement Algorithm for Storage Resource Managers in Data Grids. Conference on High Performance Networking and Computing. Proceedings for the 2002 AGM/IEEE conference on Supercomputing. Baltimore, Maryland, 2002.

(Continued)

*Primary Examiner* — Wing Chan
*Assistant Examiner* — Kostas Katsikis
(74) *Attorney, Agent, or Firm* — Perkins Coie LLP

(57) ABSTRACT

A method and an apparatus to automatically create storage resource management (SRM) paths has been presented. In one embodiment, the method includes monitoring a data storage system to collect configuration data of storage objects in the data storage system and automatically creating a storage resource management (SRM) path for a storage object in the data storage system using at least a portion of the configuration data in response to a user request to scan the storage object.

21 Claims, 5 Drawing Sheets

U.S. PATENT DOCUMENTS

2005/0256881 A1 11/2005 Harrison et al.
2005/0262268 A1 11/2005 Furukawa et al.
2007/0016681 A1* 1/2007 Suzuki et al. ............... 709/227

OTHER PUBLICATIONS

Keith Oborn, NetApp DataFabric Manager, www.netapp.com, © 2005, Network Appliance, Inc. Sunnyvale, CA, 2 pages.
Tobin Sears, DataFabric Manager, Distributing Data with DFM, Jan. 2004, Network Appliance, Inc., Sunnyvale, CA, 17 pages.
Unknown Author, DataFabric Manger 3.2, Release Notes, Jul. 2005, Network Appliance, Inc. Sunnyvale, CA, 62 pages.
Co-Pending U.S. Appl. No. 11/341,467 filed Jan. 27, 2006.
Non-Final Office Action Mailed Jan. 23, 2009 in Co-Pending U.S. Appl. No. 11/341,467 filed Jan. 27, 2006.
Final Office Action Mailed Aug. 18, 2009 in Co-Pending U.S. Appl. No. 11/341,467 filed Jan. 27, 2006.
Non-Final Office Action Mailed Jan. 6, 2010 in Co-Pending U.S. Appl. No. 11/341,467 filed Jan. 27, 2006.
Final Office Action Mailed Jul. 8, 2010 in Co-Pending U.S. Appl. No. 11/341,467 filed Jan. 27, 2006.
Notice of Allowance Mailed Nov. 16, 2010 in Co-Pending U.S. Appl. No. 11/341,467 filed Jan. 27, 2006.

* cited by examiner

# AUTO-CREATION OF STORAGE RESOURCE MANAGEMENT PATHS

PRIORITY CLAIM

This application is a continuation of U.S. patent application Ser. No. 11/341,467, by Swartzlander et al., entitled "Auto-Creation of Storage Resource Management Paths," filed Jan. 27, 2006, now U.S. Pat. No. 7,912,942 which is incorporated herein by reference.

TECHNICAL FIELD

Some embodiments of the present invention pertain to networked storage systems, and more particularly to a method and apparatus for automatically creating storage resource management (SRM) paths.

BACKGROUND

A storage appliance is a type of storage server which operates on behalf of one or more clients to store and manage shared data in a set of mass storage devices, such as magnetic or optical storage based disks. The mass storage devices are typically organized as one or more groups of Redundant Array of Independent (or Inexpensive) Disks (RAID). One configuration in which storage appliances can be used is a network attached storage (NAS) configuration. In a NAS configuration, a storage appliance can be implemented as a file server, or "filer" attached to a network, such as a local area network (LAN) or a corporate intranet. An example of such a storage appliance is any of the NetApp® Filer products made by Network Appliance, Inc. in Sunnyvale, Calif. Alternatively, storage appliances can be used in a storage area network (SAN) environment. A SAN is a highly efficient network of interconnected, shared storage devices. In a SAN, the storage appliance may provide a remote host with block-level access to stored data.

A filer may be coupled to a network and may serve as a storage device for several users, or clients, of the network. For example, the filer may store user directories and files for a corporate network or other network, such as a LAN or a wide area network (WAN). Users of the network can each be assigned an individual directory in which they can store personal files. A user's directory can then be accessed from computers coupled to the network.

A system administrator can maintain the filer, ensuring that the filer continues to have adequate free space, that certain users are not monopolizing storage on the filer, etc. A typical Multi-Appliance Management Application (MMA) can be used to monitor the storage on the filer. An example of such an MMA is the DataFabric® Manager (DFM) products made by Network Appliance, Inc. in Sunnyvale, Calif. The MMA may provide a Graphical User Interface (GUI) that allows the administrator to more easily observe the condition of the filer.

Using some conventional MMAs, the administrator may schedule a scan of a specific storage object on the filer to collect file-level information and/or statistics. Storage objects are logical units of storage within a single name space, such as a directory tree. One example of a storage object is a volume. However, conventional MMAs typically require administrators to provide the directory path via which the storage object is to be scanned. For large data storage systems maintained by multiple administrators, each administrator may not know the directory path of every storage object in the system. Furthermore, it is burdensome and inconvenient for the administrators to keep track of the current directory paths of all storage objects in the system. As a result, many administrators find the scanning tools provided by these conventional MMAs difficult to use.

SUMMARY OF THE INVENTION

A method and an apparatus for automatically creating SRM paths are disclosed. In one embodiment, the method includes monitoring a data storage system to collect configuration data of storage objects in the data storage system and automatically creating a storage resource management (SRM) path for a storage object in the data storage system using at least a portion of the configuration data in response to a user request to scan the storage object.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Described herein are methods and apparatuses to automatically create storage resource management (SRM) paths. Note that in this description, references to "one embodiment," "an embodiment," or other similar phrasing means that the feature being referred to is included in at least one embodiment of the present invention. Further, such references do not necessarily all refer to the same embodiment. Thus, the present invention can include a variety of combinations and/or integrations of the embodiments described herein.

According to an embodiment of the invention, a data storage system is monitored to collect configuration data of storage objects in the data storage system. When a user requests to scan one of the storage objects, a storage resource management (SRM) path for the storage object is automatically created using at least a portion of the configuration data, and therefore, relieving the user of the task of creating the SRM path. Consequently, the user (e.g., system administrator) does not have to be aware of the interconnections of the storage object to other components (such as host agents) within the data storage system in order to be able to initiate a scan of the storage object. Details of the above terms will be discussed below with reference to various embodiments of the present invention.

Figure 1:
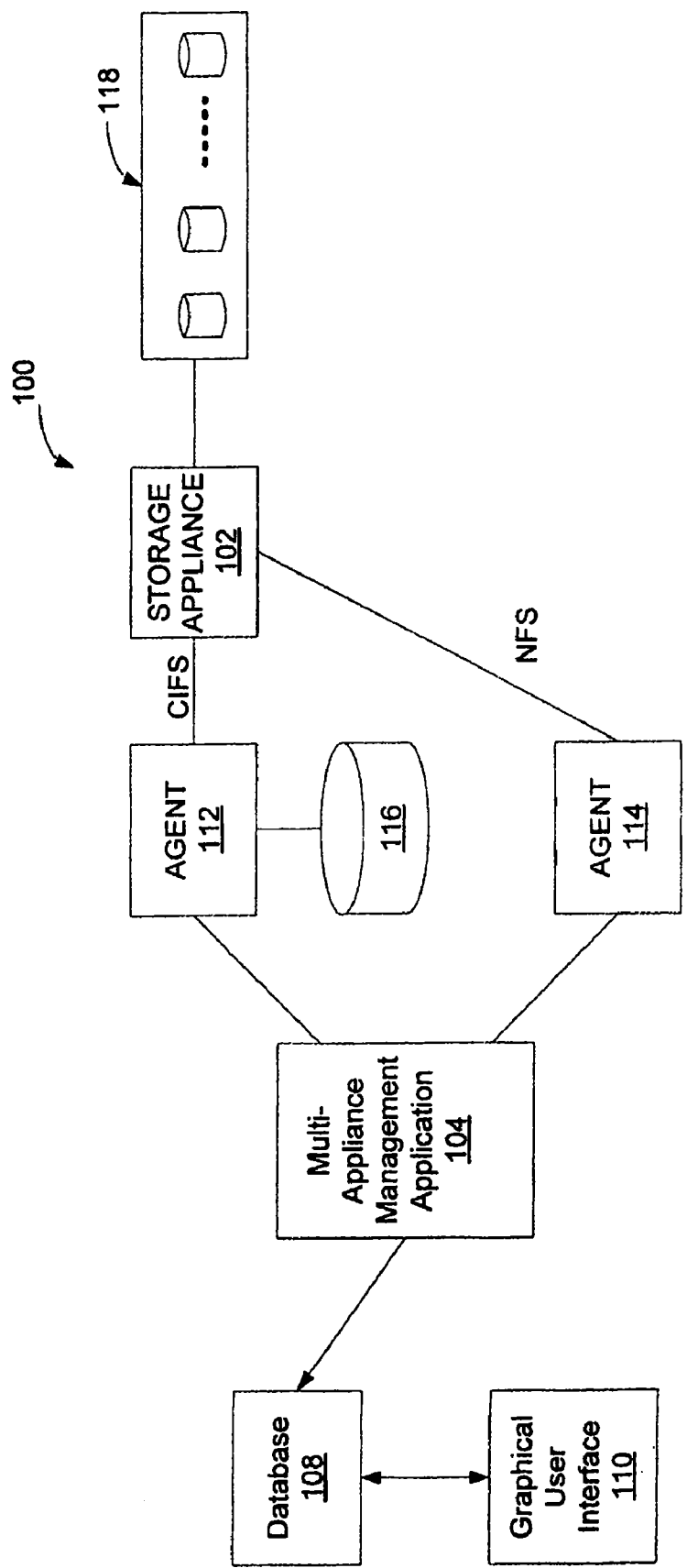
FIG. 1 illustrates a monitoring system for a storage server.

FIG. 1 illustrates a data storage system. In the current description, a data storage system refers to a group of computing devices and data storage devices coupled to each other via a network to provide storage and management of data. The system 100 includes a storage appliance 102, a volume 118, an MMA 104, a database 108, a graphical user interface (GUI) 110, and two host agents 112 and 114. The storage appliance 102 may be a filer. For the purpose of simplifying the illustration, only a single storage appliance, i.e., the storage appliance 102, is shown in FIG. 1. However, the system 100 may include other storage appliances. The MMA 104, the database 108, and the GUI 110 may be implemented on a single server. Alternatively, they may be implemented on separate servers and/or computers.

In one embodiment, the MMA 104 runs on an independent server and is responsible for storage resource management (SRM). SRM includes monitoring and management of storage resources within the system 100, such as, for example, applications, files, file systems, networks, etc. The MMA 104 may scan storage objects to collect information about storage objects on (or managed by) the filer 102 to report back to a system administrator by scanning the storage objects. To collect information about a storage object, the MMA 104 may recursively examine a directory path of the storage object for information about the storage object (e.g., file-level statistics). As is well known in the related art, recursive examination involves the use of a procedure, subroutine, function, or algorithm that calls itself in a step having a predetermined termination condition so that successive repetitions of the procedure, subroutine, function, or algorithm are processed until the predetermined termination condition is met at which time the rest of each repetition is processed from the last one called to the first. Such scanning is hereinafter referred to as a "path walk" (also known as "file walk" or "filewalk").

Storage objects are logical units of storage within a single name space, such as a directory tree. One example of storage objects is a quota tree (also known as a "Qtree"). A Qtree is a top-level subdirectory (i.e., the level of director immediately beneath a root of a directory tree), which has special properties for managing quotas. For example, a quota may be set on a Qtree that limits to a total size of all files inside the Qtree. In some cases, quotas are associated with users so that a user may not create files totaling more than a predetermined size. Another example of a storage object is a volume. In some embodiments, a volume is a logical data set that involves a group of storage devices (e.g., magnetic disks, optical disks, etc.), which may be assigned a name and be viewed as a file system. In some systems, a volume is the largest unit of storage that contains a file system on a filer, such as the volume 118 on the filer 102 in FIG. 1.

Some storage objects may be accessed via one or more shares, such as volumes. A share is a set of data sets, such as files (also known as a directory tree). In some data storage systems, a share may be assigned a name and made available to other components (e.g., storage appliances, servers, etc.) in the system through a data sharing protocol (e.g., Common Internet File System (CIFS), Network File System (NFS), etc.). Alternatively, some storage objects may be directly accessed, such as a storage device having a logical unit number assigned (also referred to as a LUN).

In some embodiments, the storage appliance 102 is coupled to the volume 118. The volume 118 may include one or more physical hard drives or removable storage drives that comprise the storage for the storage appliance 102. For example, the volume 118 may comprise a RAID structure. The storage appliance 102 may also be coupled to additional volumes that comprise storage. In some instances, the volume 118 may appear and function as a single entity even though the volume 118 may contain several separate physical drives. As mentioned above, the volume 118 may be viewed as a storage object on which a path walk can be performed.

To perform a path walk on a storage object as defined above, the MMA 104 may schedule the path walk and a host agent (e.g., the host agents 112 and 114) may execute the path walk. In some embodiments, the host agent "walks" the specified directory path and gathers per-file and/or per-directory data. During the path walk, the MMA 104 may determine some characteristics of the files stored on the storage appliance 102. Examples of some characteristics of the files include the file names, size of the files, location of files, the location of directories relative to each other, basic structure of a directory tree stored thereon, etc. These results can be accumulated, sorted, and stored in a database, where the administrator can later access them. The MMA 104 may also summarize the results of the path walk so that they are more readable and more easily understood by the administrator.

Before performing path walks on storage objects, the MMA 104 may periodically monitor the system 100 to collect configuration data of the storage objects. Configuration data of a storage object includes information on the setup of the storage object and interconnections between the storage object and other components within the data storage system 100, such as, for example, the host agent on which the storage object is mounted, the shares through which the storage object is exported, etc. In one embodiment, the MMA 104 uses the configuration data to create SRM paths for the storage objects.

In some embodiments, a SRM path of a storage object is a directory path defined to allow the gathering of file-level statistics of the storage object, for example, the oldest files in the storage object, the largest files in the storage object, etc. In a large data storage system maintained by multiple administrators, it is difficult for every administrator to know the current SRM path of each storage object in the data storage system. Thus, having the MMA 104 create a SRM path for a storage object automatically when an administrator requests a path walk on the storage object (more details of some embodiments of the MMA 104 creating the SRM path are discussed below with reference to FIG. 4) relieves the administrators from keeping track of the SRM paths of all of the storage objects in the system, which could be an overwhelming and burdensome task. More details of some embodiments of the MMA 104 creating the SRM path are discussed below with reference to FIG. 4.

After the MMA 104 has scheduled a path walk, the host agents 112 and 114 may execute the path walk for the MMA 104. A host agent may be implemented on an independent server. Storage appliances may be mounted on one or more host agents. For instance, the filer 102 is mounted on both host agents 112 and 114. The host agents 112 and 114 may allow the MMA 104 to access the filer 102 in a secure and platform independent way. By having the host agents 112 and/or 114 to execute path walks rather than having the MMA 104 to execute path walks, the MMA 104 can save its resources for other tasks, such as monitoring current activity on the filer 102. Moreover, multiple host agents can be added to the system 100 to perform a complete path walk in less time.

According to one embodiment of the invention, the host agents 112 and 114 may use different file sharing protocols. For example, the host agent 112 uses CIFS, while the host agent 114 uses NFS. In some embodiments, the host agent 112 is coupled to storage 116 to store the results of a path walk while the path walk is still in progress and before the results are transferred to the MMA 104. The host agent 114 may or may not be coupled to any storage for this purpose.

The results of a path walk may be transferred to and stored on the database server 108 after the path walk is complete. The database server 108 can then be accessed by the GUI 110, so that system administrator can search the results of the path walk. Through the GUI 110, the administrator may perform various tasks, such as parsing the results of a specific file walk and monitoring the total size of files stored on the filer 102, the size of particular directories and their subdirectories, the parents of specific directories, etc. According to one embodiment, the GUI 110 may be a web-based Java application.

Figure 2:
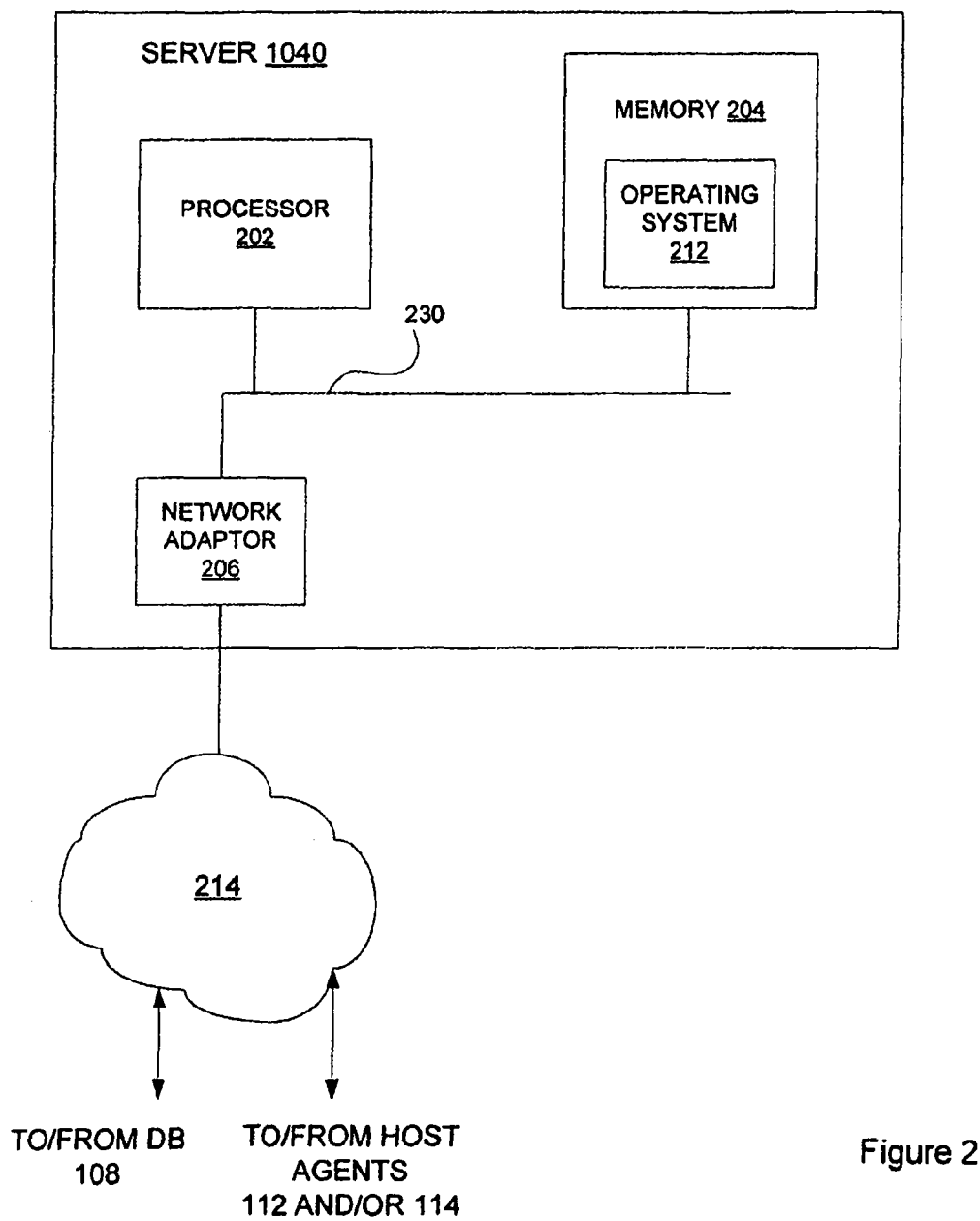
FIG. 2 illustrates a block diagram of a server usable in some embodiments of the invention.

FIG. 2 illustrates a block diagram of a server 1040 usable in some embodiments to run the MMA 104. The server 1040 includes a processor 202, a memory 204, and a network adapter 206. These components are linked through a bus system 230, which may include one or more physical buses and/or controllers, bridges, etc. Note that the server 1040 may have different configurations in different embodiments. Moreover, the server 1040 may include more or less components than those shown in FIG. 2.

The processor 202 may be any appropriate microprocessor or central processing unit (CPU). The memory 204 may include a main random access memory (RAM), as well as other memories including read only memories (ROM), flash memories, etc. The operating system 212 is stored in the memory 204. The operating system 212 may be any computer operating system, such as a UNIX or Windows based system. The network adapter 206 allows the server 1040 to communicate with remote computers over the network 214. For example, the server 1040 may send data to the database 108 via the network 214 in some embodiments. The server 1040 may also communicate with host agents 112 and 114 via the network 214.

Figure 3A:
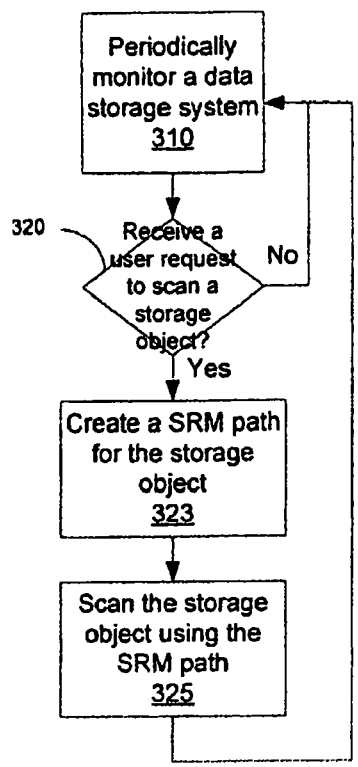
FIG. 3A illustrates one embodiment of a process to automatically create SRM paths.

FIG. 3A illustrates one embodiment of a process to automatically create SRM paths in a data storage system. The process may be performed by processing logic that may comprise hardware (e.g., circuitry, dedicated logic, etc.), software (such as a program operable to run on a general-purpose computer system or a dedicated machine), firmware, or a combination of any of the above.

In one embodiment, configuration data of storage objects within the system may change over time. Thus, processing logic periodically monitor a data storage system in order to update its knowledge of the current configuration of storage objects within the system (processing block 310). To periodically monitor the data storage system, processing logic may check the configuration of the data storage system at regular time intervals. Processing logic may collect configuration data of various storage objects within the data storage system in order to prepare for creating SRM paths for the storage objects. To collect configuration data of a storage object, processing logic may recursively examine the directory path of the storage object to gather configuration data of the storage object. As discussed above, configuration data of a storage object includes information on the setup and connection of the storage object within the data storage system. More details of processing block 310 are discussed below with reference to FIG. 3B.

Processing logic checks whether a user (such as a system administrator) requests to scan any of the storage objects (processing block 320). If no user request is received, processing logic returns to processing block 310 to repeat the periodic monitoring of the data storage system. Otherwise, processing logic creates a SRM path for the storage object in response to the user request (processing block 323). To create the SRM path for the storage object, processing logic generates a directory path via which the storage object may be accessed in order to be scanned, where the directory path may include a drive name assigned to the storage object, names of folders within which the storage object resides, names of shares through which the storage object is exported, etc. In some embodiments, processing logic uses the configuration data collected to put together a SRM path for the storage object. For instance, processing logic may use a mount and a share discovered during the periodic monitoring to create the directory path corresponding to the storage object. Via the SRM path created, processing logic then scans the storage object to service the user request (processing block 325).

Figure 3B:
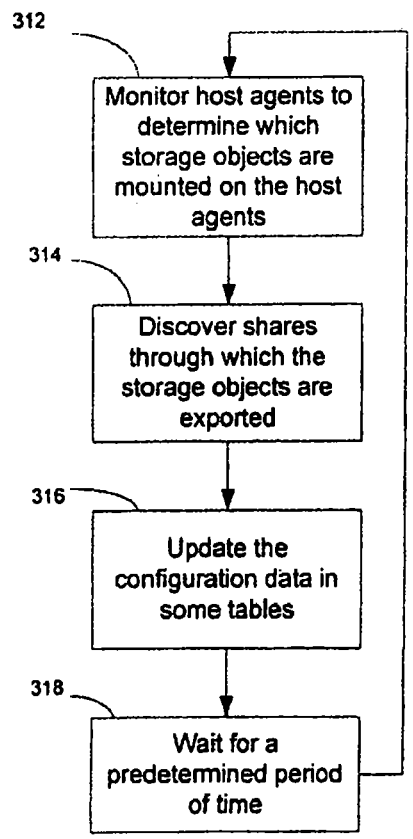
FIG. 3B illustrates one embodiment of a process to monitor a data storage system.

FIG. 3B illustrates one embodiment of a process to periodically monitor a data storage system, such as in block 310.

In one embodiment, processing logic monitors host agents in the data storage system to determine which storage objects are mounted on which host agents (processing block 312). Note that multiple storage objects may be mounted on a single host agent, and likewise, a single storage object may be mounted on multiple host agents, such as the storage objects on the filer 102 in FIG. 1. Processing logic discovers shares through which the storage objects are exported (processing block 314). In some embodiments, a share is a set of data sets, such as files (also known as directory tree), which is assigned a name and is made available to other components in the system through a data sharing protocol (e.g., CIFS, NFS, etc.). The shares may include NFS shares and/or CIFS shares for example. Processing logic then updates configuration data, such as the mounts and the shares determined above, in an appropriate data structure or structures, such as a NFS export table, a CIFS shares table, etc. (processing block 316). In one embodiment, these tables may be stored in a storage device within a server running a MMA (e.g., the server 1040 in FIG. 2). Details of some embodiments of the monitor database are discussed below with reference to FIG. 4.

After updating the monitor database, processing logic waits a predetermined period of time, such as 30 minutes (processing block 318). Then processing logic transitions back to processing block 312 after waiting the predetermined period of time to repeat the processing blocks 312-318 to monitor the data storage system. In some embodiments, the predetermined period of time may be set by a user with administrative privileges during initial setup of the data storage system. Alternatively, a default period of time may be used. Moreover, users with administrative privileges may modify the period of time later.

Figure 4:
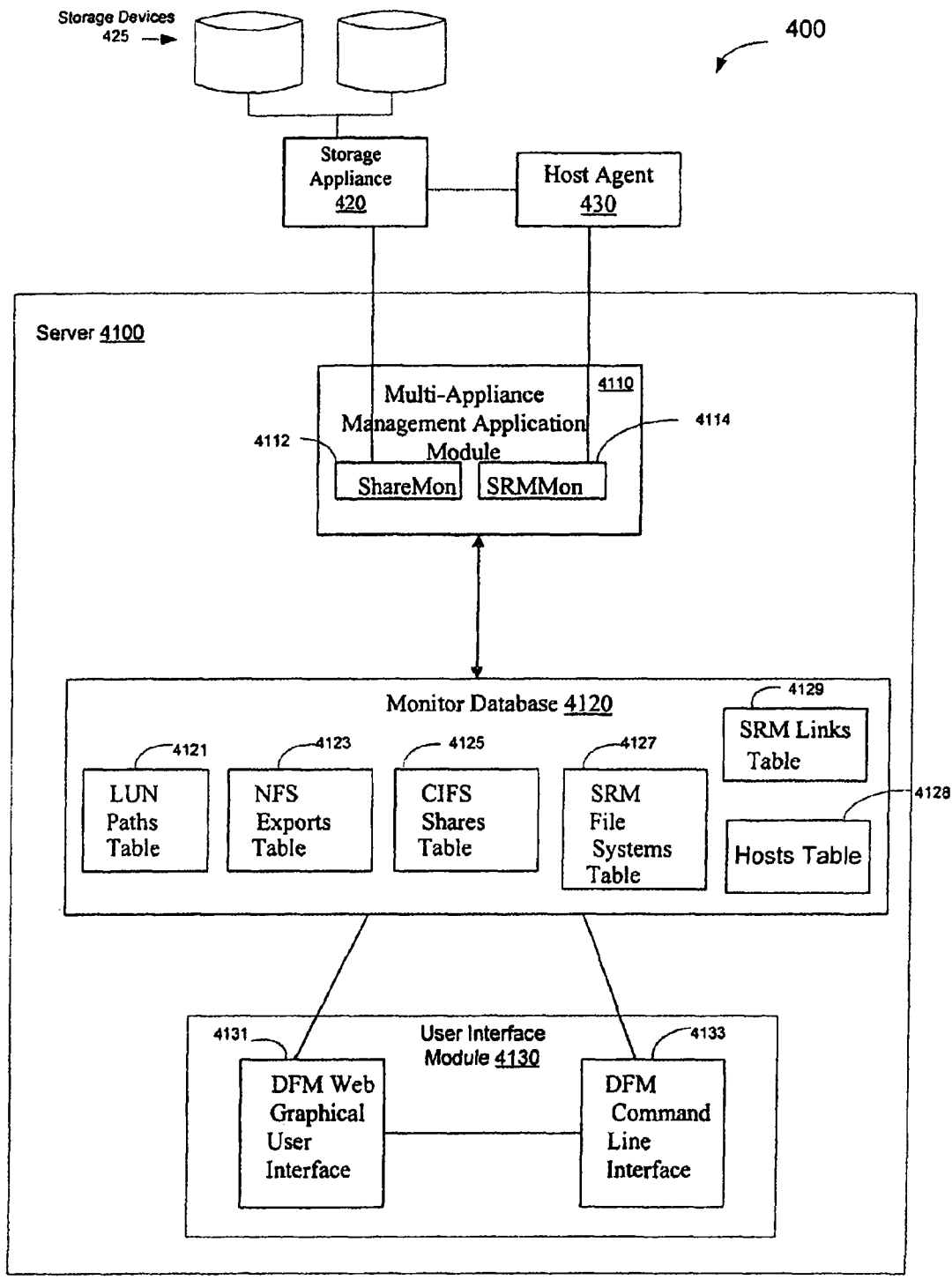
FIG. 4 illustrates one embodiment of a system to automatically create SRM paths in a data storage system.

FIG. 4 illustrates one embodiment of a system to automatically create SRM paths in a data storage system. The system 400 includes a server 4100, a storage appliance 420, storage devices 425, and a host agent 430. The server 4100 is coupled to the storage appliance 420 and the host agent 430. Note that there may be multiple storage appliances and host agents coupled to the server 4100. However, to simplify description, only one storage appliance and one host agent are shown in FIG. 4.

In some embodiments, the storage appliance 420 includes a filer. The storage appliance 420 may be coupled to some storage devices 425, such as magnetic disks, optical drives, etc. The storage devices 425 may be organized into volumes and be accessed through the storage appliance 420. The storage appliance 420 may be further coupled to the host agent 430. The host agent 430 may have a UNIX operating system, a Linux operating system, a Windows operating system, etc.

In one embodiment, the server 4100 includes a MMA module 4110, a monitor database 4120, and a user interface module 4130. The MMA module 4110 is logically coupled to the monitor database 4120, which is further logically coupled to the user interface module 4130. The MMA module 4110 includes a storage resource management monitor module 4114 and a ShareMon module 4112. The storage resource management monitor module 4114 is a module to monitor data resources within the system 400. In some embodiments, the storage resource management monitor module 4114 periodically monitors the NFS mounts in host agent 430 having a UNIX or Linux operating system. In some embodiments, the ShareMon module 4112 discovers shares through which storage objects of the storage appliance 420 are exported. In one embodiment, the storage appliance 420 exports details about the shares through application programming interface (APIs). The ShareMon module 4112 uses these APIs to retrieve the details about the shares and store the details in one or more tables in the Monitor Database 4120. The shares may include NFS shares if the storage appliance 420 is accessed through a UNIX or Linux operating system. Alternatively, the shares may include CIFS shares if the storage appliance 420 is accessed through a Windows operating system. In other embodiments, the host agent 430 may implement an operating system other than the above mentioned operating systems to access the storage appliance 420.

As mentioned above, the MMA module 4110 is coupled to the monitor database 4120. The monitor database 4120 stores configuration data of the data storage system 400. In one embodiment, the monitor database 4120 includes various tables to store the configuration data, such as a LUN path table 4121, a NFS exports table 4123, a CIFS shares table 4125, a SRM file system table 4127, a Hosts table 4128, and a SRM links table 4129. In some embodiments, the storage resource management monitor module 4114 updates the SRM file system table 4127 with the current NFS mounts in the host agent 430. Both the device name and the path name of each NFS mount may be stored in the SRM file system table 4127. In some embodiments, the ShareMon module 4112 updates the NFS exports table 4123 with NFS shares discovered. Moreover, the ShareMon module 4112 may update the CIFS shares table 4125 with CIFS shares discovered. In some embodiments, the SRM links table 4129 stores the mapping between the storage objects and SRM paths. The SRM links table 4129 may contain a SRM path identification (ID) and a Storage Object ID for each mapping. In some embodiments, LUN exports may be stored in the LUN paths table 4121.

To further illustrate the above concept, consider the following example. Suppose the NFS exports table 4123 has the following entries for a storage appliance, "Filer1":

| Storage Appliance | NFS Exports |
|---|---|
| Filer1 | /vol/vol1 |
| Filer1 | vol/vol2 |

Further suppose that the CIFS shares table 4125 stores the following entries for another storage appliance, "Filer2":

| Storage Appliance | CIFS share | Path |
|---|---|---|
| Filer2 | csvol3 | /vol/vol3 |
| Filer2 | csvol4 | /vol/vol4 |

In addition, the SRM file systems table 4127 has the following entries:

| Agent | Device Name | Path Name |
|---|---|---|
| HostAgentI | /mntvol1 | /vol/vol1 |
| HostAgentI | /mntvol2 | /vol/vol2 |

Moreover, the Hosts table 4128 as shown in FIG. 4 has a list of host agents in the system, including HostAgentl and HostAgent2 in the current example. HostAgentl is a UNIX host agent and HostAgent2 is a Windows host agent.

In one case, a user requests to perform a path walk on the storage object, /vol/vol1. In response to the user's request, the MMA module 4110 finds the device name for /vol/vol1 using the SRM file systems table 4127. According to the first entry in the SRM file systems table 4127 above, the device name corresponding to the storage object /vol/vol1 is /mntvol1. Therefore, the SRM path created for the storage object vol/vol1 is HostAgentl:/mntvol1. HostAgentl is able to access Filer1 using NFS protocol.

In another case, the user requests to perform a path walk on the storage object /vol/vol3. The MMA module 4110 uses the information from the CIFS shares table 4125 to determine that the storage object /vol/vol3 may be accessed through the CIFS share csvol3 and the storage object /vol/vol3 is on the storage appliance Filer2. The MMA module 4110 goes through each Windows host agent in the Hosts table 4128 and verifies if the Window host agent can access the storage object /vol/vol3 using the CIFS share csvol3. As soon as the MMA module 4110 finds a Windows host agent that can access the storage object /vol/vol3 using the CIFS share csvol3, which is HostAgent2 in the current example, the MMA module 4110 creates the SRM path for /vol/vol3 using the host agent's name, the storage appliance's name, and the CIFS share's name. In the current example, the SRM path created for /vol/vol3 is HostAgent2:\\Filer2\csvol3.

In some embodiments, the MMA Module 4110 updates the SRM links table 4129 to store the mapping between the storage objects, /vol/vol1 and /vol/vol3, and their corresponding SRM paths. The updated SRM links table 4129 includes the following entries:

| Storage Object | SRM Path |
|---|---|
| Filer1:/vol/vol1 | HostAgentI:/mntvol1 |
| Filer2:/vol/vol3 | HostAgent2:\\Filer2\csvol3 |

Referring to FIG. 4, the monitor database 4120 resides within the server 4100. Alternatively, the monitor database 4120 may reside on a data storage device external to the server 4100. As mentioned above, the monitor database 4120 is further coupled to the user interface module 4130.

In one embodiment, the user interface module 4130 includes a graphical user interface module 4131 and a command line interface module 4133. The graphical user interface module 4131 may include a web graphical user interface module operable to interact with a web browser on a client computing device (e.g., a personal computer, a workstation, etc.) coupled to the server 4100. Alternatively, a user may access the command line interface module 4133 using telnet from a client computing device coupled to the server 4100. The client computing device may be coupled to the server 4100 wirelessly or via wirelines. Moreover, the client computing device may locate at the same physical location as the server 4100 or at a different physical location from the server 4100.

Many of the techniques introduced above have been described in the context of a network-attached storage (NAS) environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. For example, the SRM path creation techniques described above may be applied to LUNs in SAN.

Figure 5:
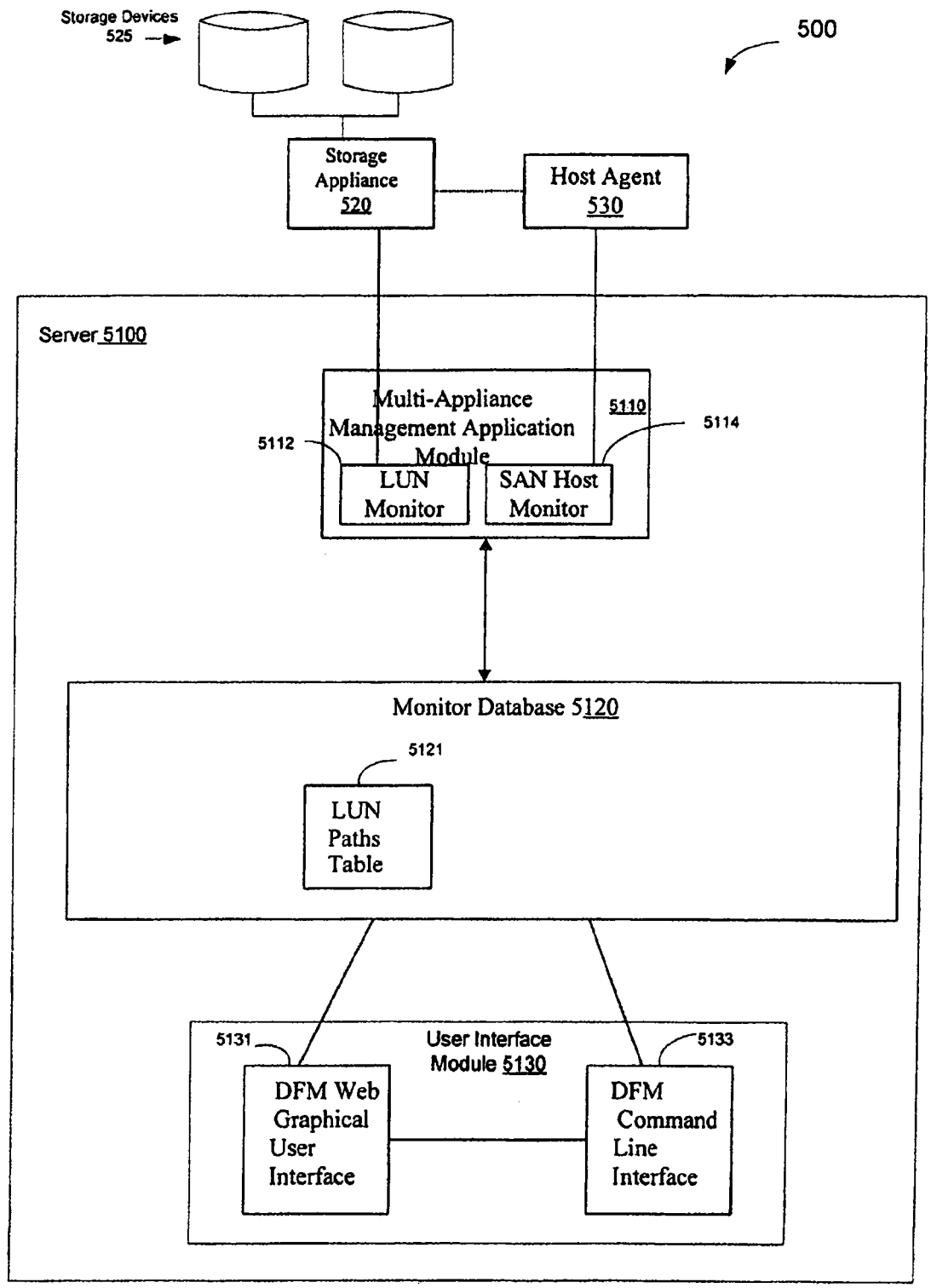
FIG. 5 illustrates one embodiment of a SAN.

FIG. 5 illustrates one embodiment of a SAN. The SAN 500 includes a server 5100 coupled to a storage appliance 520 and a host agent 530. The storage appliance 520 is also referred to as a SAN host. Note that there may be multiple storage appliances and/or host agents in the SAN, but only one storage appliance 520 and one host agent 530 are shown in FIG. 5 to avoid obscuring the view of the illustration. A number of storage objects 525 with logical unit numbers assigned to them are on the storage appliance 520. The storage objects 525 are also referred to as LUNs. In the server 5100, a MMA module 5110 includes a LUN monitor 5112, which records the names of the LUNs on the storage appliance 520. The MMA module 5110 further includes a SAN host monitor 5114 to record which LUNs 525 are mounted on which storage appliance 520. Each storage appliance 520 is coupled to a host agent 530. For each of the LUNs 525, the path to the LUN (which may include a drive letter if the operating system on the storage appliance on which the LUN is found is Windows). The host agent 530 may further determine the name of the LUN using a Small Computer System Interface ("SCSI") pass-through command. When there is a request to create an SRM path for a LUN, the MMA module 5110 goes through the LUN paths table 5121 to find a LUN having a name matching the name of the LUN requested. The host agent and the path name of the LUN with the matching name are used to create the SRM path for the LUN requested. If no LUN is found that matches the name of the LUN requested, the operation fails.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative, rather than in a restrictive sense.

The invention claimed is:

1. A method comprising:
monitoring, by a server implementing a multi-appliance management application (MMA), a data storage system to collect configuration data of a plurality of storage objects in the data storage system, wherein the server includes a processor and a memory;
receiving, by the MMA, a request to execute a traversal on a given storage object of the plurality of storage objects in the data storage system;
prior to executing the traversal, creating by the MMA an identification of a storage resource management (SRM) path for the given storage object using at least a portion of the configuration data, wherein the MMA stores the identification of the SRM path in the server implementing the MMA, and wherein the SRM path includes an identity of a host agent that is coupled between the server implementing the MMA and the given storage object; and
executing the traversal, by the MMA, on the given storage object by utilizing the identification of the SRM path.

2. The method of claim 1, wherein the MMA stores a mapping of an identification of the given storage object to the identification of the SRM path.

3. The method of claim 1, wherein the MMA stores the identity of the host agent and a directory path associated with the SRM path in an SRM data structure associated with the server.

4. The method of claim 1, wherein monitoring the data storage system comprises:
periodically monitoring a plurality of host agents on which the plurality of storage
objects are mounted; and
identifying shares through which the plurality of storage objects are exported.

5. The method of claim 4, wherein periodically monitoring the plurality of host agents comprises periodically monitoring one or more Network File System (NFS) exports mounted on one or more of the plurality of host agents.

6. The method of claim 4, wherein periodically monitoring the plurality of host agents comprises testing whether at least one of the plurality of host agents can access a Common Internet File System (CIFS) share.

7. The method of claim 4, wherein the plurality of storage objects are managed by a storage appliance coupled to the plurality of host agents, and monitoring the data storage system further comprises accessing the storage appliance via a network.

8. The method of claim 1, further comprising:
storing the configuration data in a monitor database; and
retrieving at least a portion of the configuration data from the monitor database in
response to the user request to execute a traversal on the given storage object.

9. A server comprising:
a processor;
a monitor database to store configuration data associated with a plurality of storage objects in a data storage system; and
a management application to:
receive a request to execute a traversal on a given storage object of the plurality of storage objects in the data storage system;
create an identification of a storage resource management (SRM) path for the given storage object using at least a portion of the configuration data in the monitor database, wherein the SRM path includes an identity of a host agent that is coupled between the server and the storage object; and
execute the traversal on the given storage object by utilizing the identification of the SRM path.

10. The server of claim 9, further comprising:
an SRM monitor to periodically monitor mounts of the plurality of storage objects and to update configuration data corresponding to the mounts in the monitor database; and
a share monitor coupled to the SRM monitor to discover shares through which the plurality of storage objects are exported and to update configuration data corresponding to the shares in the monitor database.

11. The server of claim 9, wherein the management application is further configured to:
store a mapping of an identification of the given storage object to the identification of the SRM path.

12. The server of claim 9, wherein the management application is further configured to:
store the identity of the host agent and a directory path associated with the SRM path in an SRM data structure associated with the server.

13. A data storage system comprising:
a processor;

a user interface module;

a plurality of storage objects;

a monitor datastore coupled to the user interface module for periodically monitoring the data storage system to collect configuration data of the plurality of storage objects in the data storage system; and a multi-appliance management application (MMA) module coupled to the monitor database and to the plurality of storage objects, the MMA module configured to:

receive a request, via the user interface module, to execute a traversal on a given storage object of the plurality of storage objects in the data storage system;

prior to executing the traversal, create an identification of a storage resource management (SRM) path for the given storage object using at least a portion of the configuration data, wherein the MMA stores the identification of the SRM path in the server implementing the MMA, wherein the SRM path includes an identity of a host agent that is coupled between the server implementing the MMA and the given storage object; and execute the traversal on the given storage object by utilizing the identification of the SRM path.

14. The system of claim 13, wherein the monitor database includes a first data structure to store mappings between the plurality of storage objects and a corresponding plurality of SRM paths.

15. The system of claim 13, wherein the monitor database includes a second data structure to store a plurality of NFS shares associated with the plurality of storage objects in the data storage system.

16. The system of claim 13, further comprising a plurality of host agents coupled to the plurality of storage objects, wherein the monitor database includes a third data structure to store information on NFS shares mounted on the plurality of host agents.

17. The system of claim 13, wherein the monitor database includes a fourth data structure to store a plurality of CIFS shares associated with the plurality of storage objects in the data storage system.

18. The system of claim 13, wherein the user interface module includes a command line interface module.

19. The system of claim 13, wherein the user interface module includes a graphical user interface module.

20. The method of claim 13, wherein the MMA stores a mapping of an identification of the given storage object to the identification of the SRM path.

21. The method of claim 13, wherein the MMA stores the identity of the host agent and a directory path associated with the SRM path in an SRM file system associated with the server.

* * * * *